United States Patent [19]

Downs

[11] 3,854,729

[45] Dec. 17, 1974

[54] RECORD DIVIDER AND PRESERVATIVE

[76] Inventor: Thomas P. Downs, 1927 Mathews Ave., Apt. A, Redondo Beach, Calif. 90278

[22] Filed: June 1, 1973

[21] Appl. No.: 365,965

[52] U.S. Cl. .............................. 274/1 R, 274/42 R
[51] Int. Cl. ............................................ G11b 3/62
[58] Field of Search ................ 274/1 R, 42 R, 39 R

[56] References Cited

UNITED STATES PATENTS

| | | | |
|---|---|---|---|
| 874,985 | 12/1907 | O'Neill | 274/39 R |
| 2,577,035 | 12/1951 | Reid | 274/42 R |
| 2,906,536 | 9/1959 | Mauerhoff | 274/42 R |
| 3,540,736 | 11/1970 | Pallie | 274/1 R |

FOREIGN PATENTS OR APPLICATIONS

| | | | |
|---|---|---|---|
| 610,772 | 10/1960 | Italy | 274/42 R |

*Primary Examiner*—Harry N. Haroian
*Attorney, Agent, or Firm*—Allan Miller

[57] ABSTRACT

A substantially circular disc is disclosed for insertion between phonograph records prior to stacking the records on the spindle of a record player. The disc aids in the preservation of phonograph records in that it enables a person to operate the automatic changer without scratching or marring the record when it is dropped to the platter. A ring is releasably attached to the disc to make said disc readily adaptable for use with 45 r.p.m. records. For use with 33 ⅓ r.p.m. records, the ring may be easily detached; or in the alternative, the disc may be inverted so that the ring is on the bottom side of the disc, as the disc is being placed on the spindle, for convenient adaptation to long playing records.

4 Claims, 9 Drawing Figures

RECORD DIVIDER AND PRESERVATIVE

BACKGROUND OF THE INVENTION

There is an urgent need for separating and protecting phonograph records during the stacking of the records on a phonograph record changer spindle, during the dropping of the record to the platter and during subsequent removal of the records from the spindle after use to prevent the sound groove portions of the respective records from contacting each other, which results in the scratching or marring of the surfaces.

Previous attempts in the prior art to meet this need have been unsatisfactory. Some discs known in the prior art for placement between the records have been made of plastic materials. The use of plastics is not recommended for it tends to create friction between the bearing surfaces of the record and the disc, thereby causing eventual harm to the records resulting from surface scratching of the records. This can be illustrated as follows:

The next record in play would fall into position and would strike the plastic dividing disc, which lacking the ability to cushion the impact of the falling record upon the divider, would cause friction between said next record in play and the divider, thereby scratching the surface of the record at an angle to the sound groove portion. Consequently, even though the plastic divider may prevent some scratching of the sound groove portions of the records, it does not prevent scratches on the upper most portion of the record intermediate said sound groove portions. Thus the continuing and cumulative scratching of the record surfaces caused by the use of said plastic material will eventually create defects in the sound reproduction quality; and will also cause skipping of the records.

Other record separating devices used in the prior art have not only been of plastic material, but have also lead-in grooves of spiral formation as part of the dividing discs themselves. These lead-in grooves on the discs have no sound mastered and only serve to again create friction between said lead-in grooves on the discs and sound grooves of the records. Thus this friction between the lead-in grooves of the divider and the sound grooves of the next record in play result in further scratching and marring of the record surface.

Another disadvantage of using a record divider disc with a spiral lead-in groove is that the disc and the record will drop separately. This will cause a 10 to 15 second delay or interruption in the playing of continuous music. On any type of commercial broadcasting, such an obvious delay of 10 to 15 seconds between records would be totally unacceptable and would result in a conspicuous period of silence between the playing of the various records.

In the applicant's invention, there is no interruption in playing time since the record and the dividing disc drop at the same time; thus, there is a continuous playing of music without any disconcerted interruption or delay.

Other record separating devices have been used in the prior art but these have also been unsuccessful, since they have been dependant upon the use of adhesive or pressure sensitive materials which eventually would cause destruction or tearing of the label on the phonograph records contacting the adhesives affixed to the face of the dividing disc. These separating discs employing adhesives have been generally smaller in diameter than the respective records they are used to separate. Since the lower face of the dividing disc is provided with the adhesive material, the next record in play is in effect suspended prior to dropping to the platter. Since the divider does not cover the entire record and since the adhesive is on the lower face of the divider, the suspension of records prior to play will result in warpage of the records.

Other discs known in the prior art have similarly been dependant on the use of adhesive material which results in the tearing off of the label of the record after repetitive use. Those record dividers were the same size in diameter as the labels of the records, again resulting in inadequate protection of the records in that the sound reproduction portion of the record is not protected and warpage of the record can result due to inadequate support of the sides of the record. Still other separating discs known in the prior art have been only suitable for 78 r.p.m. records.

Other record protective devices known in the prior art consist of a disc of thin sheet stock with cushioning material secured to both sides of the disc. Often the thickness of the sheet stock was in the range of 0.010 inches to 0.015 inches, or 10 to 15 mils. However, this thickness has found to be much too thin and too soft since it will cause a disc to bend and crumble with repetitive use. Too soft of a material will also cause the disc aperture that receives the spindle to become reamed by repetitive use. This results in the disc being pushed into the groove and broken. This type of disc known in the prior art had a thickness in the central portion between 10 to 15 mils, but the same sheet stock material increased in thickness outward from the centermost portion so that the sheet stock material itself, which was covered by the cushioning material, was considerably thicker than at the centermost portion. This difference in thickness in the sheet stock material was achieved conventionally by laminating the disc resulting in increased costs and inconvenience in manufacturing the disc.

However, the applicant's invention comprises sheet stock material, preferrably aluminum or stainless steel, of a thickness between 16 to 20 mils. This optimum range of thickness was arrived at after considerable experimetal use designed to achieve a thickness which is still consistent with the purposes of the invention in that it suitably preserves and protects the records between which it is stacked.

There are no protective discs known in the prior art which are readily adaptable for use with both 45 r.p.m. and 33⅓ r.p.m. records, without altering or removing part of the disc. As will be seen from the foregoing drawings and description, the applicant's invention comprises a disc which is readily adaptable for use with 45 r.p.m. and long playing records without the necessity of the aperture of the adaptor.

The known prior art relating to protective discs for phonograph records includes the following U.S. Pat. Nos.: 3,540,737; 2,906,536; 3,051,496; 3,540,736; and 1,683,440.

SUMMARY OF THE INVENTION

The invention comprises a disc inserted between records stacked on a spindle for the preservation of phonograph records without interfering with the regular operation of the phonograph and thereby resulting in free flowing music and causing no damage to the sound groove, stylus or remainder of the records or phonograph player. The disc is placed between the records to prevent the records from contacting each other; said disc is composed of an innermost portion 22 of the hard alloy temper or aluminum, or of stainless steel; said innermost portion having a thickness specifically between 16 to 20 mils. The outermost portion 23 is covered on both sides with soft cushioning material such as foam and/or sponge rubber.

The ring, generally designated by reference numeral 40, is releasably attached to the body of the disc 22 to make said disc readily adaptable for use with 45 r.p.m. records. For use with 78 or 33⅓ r.p.m. records, the ring may be readily detached. In the alternative, the disc may be inverted so that the ring on said disc thereby provides the proper clearance of the spindle in case of long playing records.

As will be seen, this invention also contemplates a divider disc which may be used primarily for a stack of 45 r.p.m. records without the necessity of using a conventional 45 r.p.m. adaptor.

DETAILED DESCRIPTION OF THE PREFERRED EMBODIMENT

Figures 1, 2:
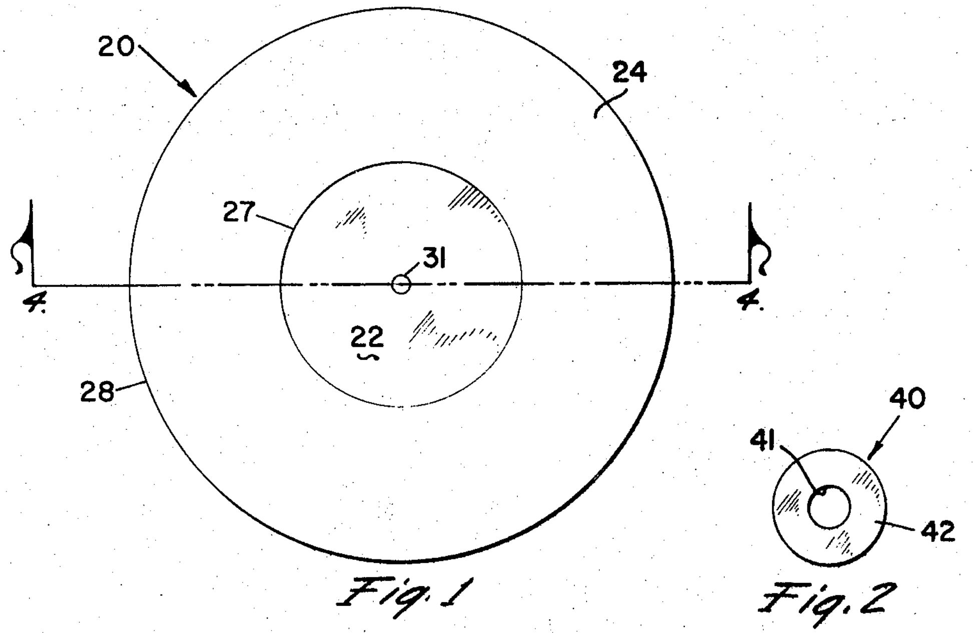
FIG. 1 is a plan view of the protective disc.
FIG. 2 is a plan view of the adaptor ring.

Referring to the drawings in this case, and particularly to FIG. 1, it may be seen that the invention contemplates and includes a substancially circular or annular disc generally designated by reference numeral 20. Disc 20 is adapted for use as a protective disc placed between phonograph records, when stacked on the spindle of an automatic record changer.

The disc thus prevents the records from contacting each other, thereby protecting the records from scratching and marring.

Figure 4:
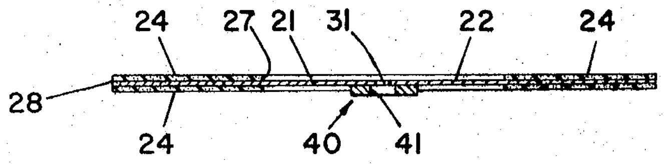
FIG. 4 is a cross-sectional view taken on line 4—4 of FIG. 1 with the protective disc inverted so that the adaptor ring is on the bottom side of said disc.

The disc in its preferred embodiment is seen in FIG. 1 wherein disc 20 comprises sheet stock of stainless steel material 21 (as shown in FIG. 4) having a thickness in the range of 16 to 20 mils or between 0.016 to 0.020 inches. The thickness of sheet stock 21 may fall within this range but should be of uniform thickness throughout for convenience and for saving costs in manufacturing.

As seen in the preferred embodiment, the sheet stock 21 may be made of aluminum or a hard alloy tempered metal or any other suitable metal. However, it will be understood that the sheet stock material need not be rigid or semi-rigid. Indeed, even plastics, transparent, or flexible materials having the requisite strength may be used.

As seen in the preferred embodiment, the disc 20 has a diameter substancially similar to the diameter of a standard long playing record.

If the disc 20 were substantially larger in diameter than that of a long playing record, it could interfere with the operation of the phonograph; and if the disc 20 were substantially smaller than the diameter of the long playing record, it would not provide adequate support between the long playing records resulting in an uneven distribution of weight on the radially innermost and outermost peripheral portions on the records when stacked, tending to cause lateral and longitudinal displacement of the records, resulting in eventual warpage of the records.

The sheet portion 21 has a centrally located hole or aperture 31 adapted to receive the spindle 90 of the record changer. The hole 31 is preferably nine-thirtyseconds of an inch in diameter which may be identical in size or substantially similar to the diameter of the central aperture in any standard long playing record.

The radially innermost portion 22 of the sheet portion 21 is preferably of a diameter between 5 to 6 inches, and is substantially circular in shape.

As shown in FIG. 4 the sheet portion 21 is exposed from the circumference of the aperture 31 to the periphery 27 of the innermost portion 22; however, said sheet portion 21 from the periphery 27 to its outermost peripheral edge 28 is covered on both sides by protective element 24 which extends radially outward from said point 27 to the outermost edge 28.

The protective element 24 may be of foam, foam rubber, sponge, felt or any suitable material being soft and cushioning. The thickness of the protective element 24 may vary, but preferably is within the range of one-thirtysecond of an inch to three-sixteenths of an inch.

Referring to FIG. 2, is may be seen that the adaptor ring, generally designated by reference numeral 40, comprises a substantially circular or annular ring, having a centrally located hole or aperture 41. Said aperture 41 is larger in diameter than the diameter of hole 31 centrally located within disc 20. In the preferred embodiment, the diameter of aperture 41 is at least one-half inch while the diameter of aperture 31 is 9-thirtyseconds of an inch.

The adaptor ring comprises a body portion 42 made preferably of stainless steel or any suitable metal having the required capability of being magnetized, if magnetic attraction is used to attach the adaptor ring to the disc. It must be emphasized, however, that the adaptor ring need not be magnetically attached, but may be releasably attached to the disc by any conventional means, including the use of adhesives or pressure sensitive materials.

Figure 3:
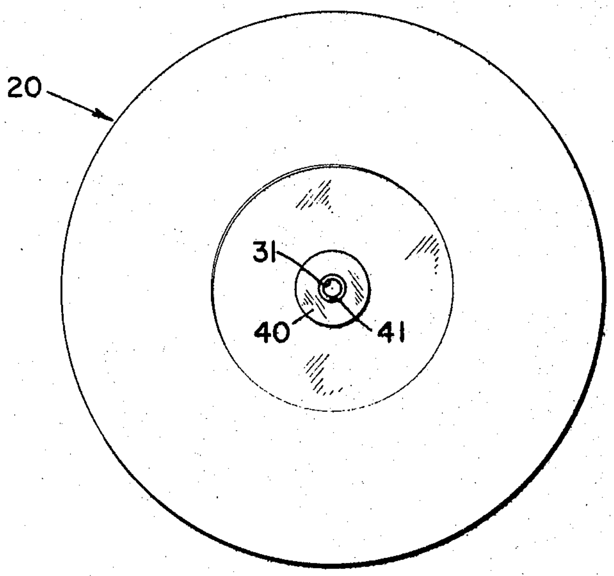
FIG. 3 is a plan view of the protective disc with the adaptor ring attached to the top of the disc.

Thus the adaptor ring can be readily attached and removed from the disc 20. As shown in FIG. 3, when the adaptor ring 40 is attached to the disc 20 for use with 45 r.p.m. records, the ring 40 is concentrically placed in position over the disc 20 so that aperture 41 and aperture 31 have the same central axis and in effect form two concentric circles.

For use with long playing records, the ring 40 may be readily removed from disc 20 or the disc 20 may be inverted so that the ring 40 is on the bottom or downward side of the disc 20 so as not to interfere with the function of the spindle or smooth operation of the changer during the playing of long playing records.

The outer diameter of body portion 42 of adaptor ring 40 is slightly less than the diameter of the standard center aperture of a standard 45 r.p.m. record, which is approximately 1½ inches. The thickness of the adaptor ring extending below the protective element 24 is at least the thickness of a standard 45 r.p.m. record. Consequently, the 45 r.p.m. record can be placed on disc 20 so that the adaptor ring 40 fits inside the center aperture of the 45 r.p.m. record, said ring being in an abutting or closely proximate relationship to the radially innermost label portion of the 45 r.p.m. record. This prevents lateral or longitudinal displacement of the 45 r.p.m. record when the adaptor ring is used.

It is obvious that another advantage of using the adaptor ring described herein is that a conventional 45 r.p.m. adaptor ring need not be inserted over the spindle.

Figure 5:
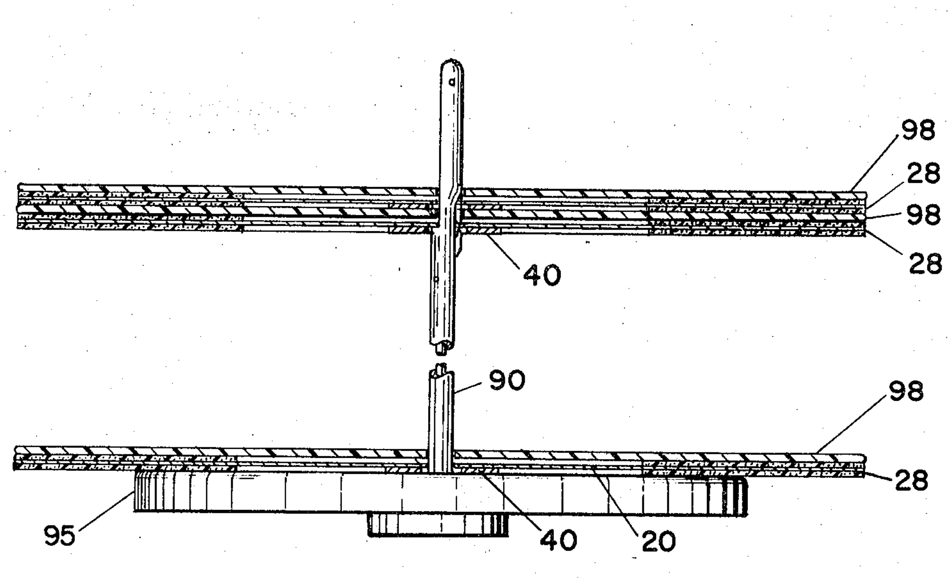
FIG. 5 is a fragmentary side elevation view showing the protective disc with the adpator ring attached on the bottom side of the disc for use with 33⅓ r.p.m. records, as the combination disc and ring appear when placed on the spindle between stacked records.

As shown in FIG. 5, the protective disc 20 with the adaptor ring 40 attached may readily be used for long playing records when the disc 20 is inverted when placed on the spindle 90 of a turntable 95 so that the adaptor ring 40 is on the bottom side of the disc 20. Thus, the cushioning material 24 of disc 20 is in immediate contact with the sound groove zone of phonograph record 98 for protection of the sound groove zone of record 98 from scratching and marring. The ring 40 will make contact with the label area (not shown) of the long playing record below it when stacked on the spindle. However, the sound groove zone on one record 98 will always be separated from the sound groove zone of an adjacent record 98 by the disc 20 to prevent contact between said respective sound groove zones of said records for protection and preservation of the records.

The adaptor ring 40 supports the weight of disc 20 to which it is attached and the next record in play resting on said disc placed on the spindle 90 when the disc 20 is inverted for use with long playing records.

Of course, the adaptor ring need not be releasably attached to the disc 20, but may be permanently affixed. For example, this invention also contemplates a divider disc particularly adaptable for use with 45 r.p.m. records. The preferred embodiment in that case consists of a disc 20 having an overall diameter substancially similar to the overall diameter of a 45 r.p.m. record. One may conveniently use this size disc when playing a stack of 45 r.p.m. records. More convenient use is then accomplished by having the adaptor ring permanently secured or affixed to the disc 20. Then, of course, the disc need not be made of metal sheet stock material because there is no dependence upon the use of magnetic forces to attach or secure the ring to the disc. Instead, the disc may be any suitable material such as a smooth plastic which may be flexible and covered on both sides in the radially outermost portion with a cushioning material.

Our discussion so far has been concerned with using a protective disc on record players having conventional spindles.

However, still another embodiment of this invention contemplates the interchangeable use of a protective disc on unconventional spindles, as well as conventional spindles. This embodiment comprises a combination protective disc and circular magnet. The protective disc is similar in size, shape and construction to the disc described in FIG. 1. The radially innermost portion of said disc must be metallic to be used with the magnet. However, the radially outermost portion of the sheet stock material can be covered with any suitable cushioning material.

Figures 6, 7:
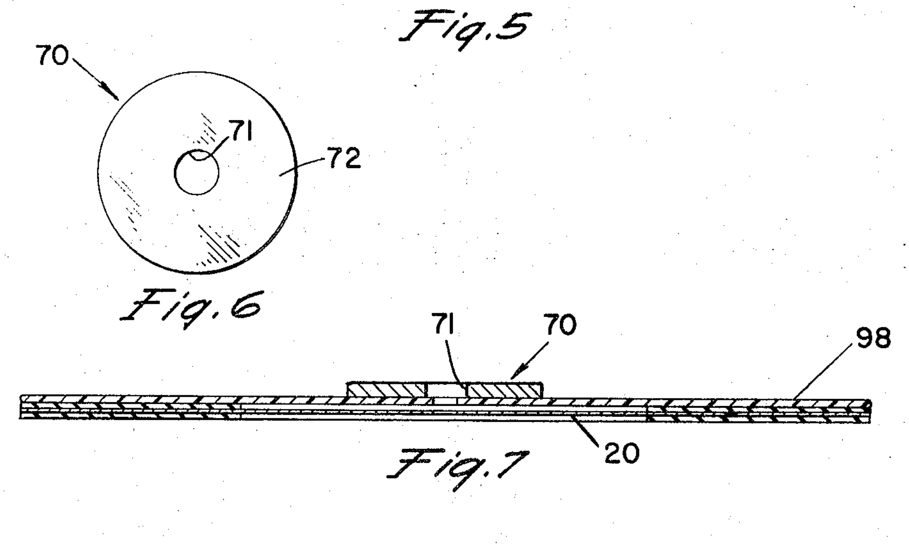
FIG. 6 is a plan view of a magnet used to secure the protective disc to a long playing record by means of magnetic force.
FIG. 7 is a sectional view showing a long playing record intermediate the magnet and the protective disc.

The purpose of the magnet is to secure the protective disc, as shown in FIG. 1, to the record by means of magnetic attraction. The magnet, generally designated by reference numeral 70, is shown in FIG. 6 as being substancially circular or annular in shape. The central aperture 71 of said magnet 70 should be at least one-half inch in diameter and is purposely made larger than the central aperture of a long playing record which is nine-thirtyseconds of an inch. Thus, the circumference of the aperture 71 of said magnet will not contact the spindle and can not possibly interfere with the operation of the spindle.

The magnet 70 has an outer diameter of approximately 4 inches, substantially similar to the diameter of the label area of a standard long playing record. The body portion 72 is made of suitable magnetic material and is of a suitable thickness to provide sufficient magnetic attraction.

As seen in FIG. 7, a long playing record 98 is placed on the spindle (not shown) intermediate the magnet 70 and the protective disc 20. The magnet is capable of magnetically attracting the metallic protective disc through the plastic of the long playing record to the magnet, causing the magnet, record and protective disc to drop smoothly and simultaneously. Depending on the strength of the magnet used, the exposed portion might magnetically attract the central metal sheet stock portion 22 of an adjacent protective disc, preventing the adjacent disc from dropping smoothly with the next record in play to the platter. Thus, a suitable means must be used for demagnetisation of the exposed end of the magnet 70 so that the degree of magnetisation existing at the exposed end is drastically reduced. This may be done by applying a magnetising force at the exposed end which opposes that producing the original magnetising force.

Figure 8:
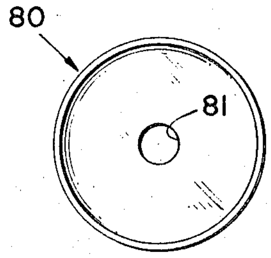
FIG. 8 is a plan view of a demagnetisation cup.

One means of reducing the magnetisation existing at the exposed end may include the use of a demagnetisation cup generally designated by reference numeral 80, as shown in FIG. 8, which has a central aperture 81 smaller in diameter than the aperture 71 of the annular magnet 70, but still larger than the central aperture of a standard long playing record.

Figure 9:
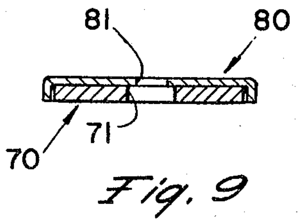
FIG. 9 is a cross-sectional view of the demagnetisation cup in a nesting relationship on the magnet.

FIG. 9 is a cross-sectional view of the demagnetisation cup 80 in a nesting relationship over the magnet 70, resulting in demagnetisation of the exposed end so that in the preferred embodiment, only the unexposed end abutting the label area of the record is left with enough magnetising force to secure the record to the protective disc as shown in FIG. 7.

Another embodiment of the protective disc may be particularly adaptable for use with an unconventional spindle such as a three-pronged spindle. The central aperture of this embodiment is larger than the aperture of a standard long playing record.

Three apertures are circumferentially placed around the central aperture equidistant from one another. The three apertures are located within the innermost portion of the sheet stock material. Interspaced between said apertures are three pegs or pins, equidistant from one another which can be inserted into the three corresponding holes of the unconventional record. This protective disc for use with the three-pronged spindle may be used in combination with the annular magnet as described above. The outermost portion of said disc may be covered on both sides with foam or other suitable cushioning material as described herein for automatic operation; or in the alternative, one side of the disc may be uncovered for manual operation.

I claim:

1. An annular protective disc for use with 45 r.p.m. records for insertion between said records prior to stacking the records on the spindle of a record player, while said disc is substantially the same in circumference as a 45 r.p.m. record, said disc having a radially innermost portion and a radially outermost portion in concentric relationship therewith, said radially outermost portion coextensive with the sound groove zone of a 45 r.p.m. record, comprising:

a layer of annular sheet stock of magnetic material coextensive with the diameter of said disc, having a centrally disposed aperture adapted to receive the spindle of a record player, said aperture similar to the size of the aperture in a long playing record, cushioning material secured to the top and bottom of the radially outermost portion, to protect said sound groove zone, an annular magnetic ring, having an outer circumference slightly less than the circumference of the central aperture of a 45 r.p.m. record, said ring adapted to fit within said central aperture in a close juxtaposition relationship to the circumference of said aperture, wherein the bottom end of said magnetic ring is concentrically mounted with respect to the aperture of the sheet stock, to prevent lateral or longitudinal displacement of the 45 r.p.m. record, said magnetic ring having an inner diameter of approximately ½ inch, and having the requisite strength and thickness to secure a 45 r.p.m. record to said protective disc by means of magnetic attraction when the 45 r.p.m. record is placed on said spindle intermediate the top end of said magnetic ring and said protective disc, the thickness of said magnetic ring being greater than the combined thickness of said cushioning material and said 45 r.p.m. record, so that said top end of said magnetic ring is higher than the level of the label area of said 45 r.p.m. record.

2. The structure set forth in claim 1 above, further including:

an annular cup adapted to fit in a nesting relationship over said top end of said magnetic ring opposite said bottom end abutting said protective disc.

3. An annular protective disc for use with phonograph records for insertion between said records prior to stacking the records on the spindle of a record player, wherein said disc is substantially the same diameter as a long playing record, said disc having a radially innermost portion and a radially outermost portion in concentric relationship therewith, said radially outermost portion coextensive with the sound groove zone of a long playing record, comprising:

a layer of annular sheet stock of magnetic material coextensive with the diameter of said disc, having a centrally disposed aperture adapted to receive the spindle of a record player, said aperture similar to the size of the aperture in a long playing record, cushioning material secured to the top and bottom of the radially outermost portion, to protect said sound groove zone, and an annular magnetic ring having substantially the same outer circumference as the label area of a long playing record, and a centrally located aperture within said magnetic ring having an inner diameter of approximately one-half inch, said magnetic ring having the requisite strength and thickness to secure a long playing record to said protective disc by means of magnetic attraction when the long playing record is placed on said spindle intermediate said magnetic ring and said protective disc.

4. The structure set forth in claim 3 above, further including:

an annular cup adapted to fit in a nesting relationship over the end of the said magnetic ring opposite the end abutting the protective disc.

* * * * *